US011484391B2

(12) United States Patent
Benarouch et al.

(10) Patent No.: US 11,484,391 B2
(45) Date of Patent: Nov. 1, 2022

(54) ORTHODONTIC SHAPE MEMORY BAND (71) Applicant: D & D, Paris (FR)

(72) Inventors: Dan Benarouch, Paris (FR); Delphine Majbruch, Paris (FR)

(73) Assignee: D & D, Paris (FR)

(*) Notice: Subject to any disclaimer, the term of this patent is extended or adjusted under 35 U.S.C. 154(b) by 84 days.

(21) Appl. No.: 16/301,217

(22) PCT Filed: May 16, 2017

(86) PCT No.: PCT/EP2017/061661
§ 371 (c)(1),
(2) Date: Nov. 13, 2018

(87) PCT Pub. No.: WO2017/198640
PCT Pub. Date: Nov. 23, 2017

(65) Prior Publication Data
US 2019/0282336 A1 Sep. 19, 2019

(30) Foreign Application Priority Data

May 18, 2016 (FR) ...................... 1654422

(51) Int. Cl.
*A61C 7/20* (2006.01)
*A61C 7/28* (2006.01)
*A61C 7/12* (2006.01)
(52) U.S. Cl.
CPC .................. *A61C 7/20* (2013.01); *A61C 7/12* (2013.01); *A61C 7/28* (2013.01); *A61C 2201/007* (2013.01)
(58) Field of Classification Search
CPC .. A61C 7/10; A61C 7/12; A61C 7/145; A61C 7/16; A61C 7/20; A61C 7/28; A61C 2201/007; A61C 5/007
(Continued)

(56) References Cited

U.S. PATENT DOCUMENTS 4,253,828 A * 3/1981 Coles ........................ A61C 7/00
433/6
5,683,245 A 11/1997 Sachdeva et al.
(Continued)

FOREIGN PATENT DOCUMENTS

CN 101559006 A 10/2009
DE 102015009345 A1 1/2016
(Continued)

OTHER PUBLICATIONS

Carreno-Morelli, E, et al. "Three-Dimensional Printing of Shape Memory Alloys." Materials Science Forum, vol. 534, Jan. 15, 2007, doi:https://www.scientific.net/MSF.534-536.477. (Year: 2007).*
(Continued)

*Primary Examiner* — Jacqueline T Johanas
*Assistant Examiner* — Shannel Nicole Belk
(74) *Attorney, Agent, or Firm* — Ronald M. Kachmarik; Cooper Legal Group LLC (57) ABSTRACT A method for producing a shape memory band of an orthodontic appliance. The shape memory band is one piece, has a cross section that can vary according to the longitudinal position of said cross section, and includes a bonding zone configured so as to exhibit a shape substantially identical to that of a tooth. The method includes: determining an orthodontic treatment suitable for treating the teeth, determining a set of forces to be exerted locally on the teeth in order to obtain the orthodontic treatment and the shape of the surface of the teeth to which bonding zones of the shape memory band are to be bonded, and producing the shape memory band. The local cross section of the shape memory band is determined according to the forces and in such a way as to define bonding zones substantially identical to the surfaces of the teeth.

15 Claims, 5 Drawing Sheets (58) Field of Classification Search
USPC .......................................... 433/6, 18, 20, 24
See application file for complete search history.

(56) References Cited

U.S. PATENT DOCUMENTS

| | | | |
|---|---|---|---|
| 8,864,493 B2* | 10/2014 | Leslie-Martin | A61L 24/06 433/6 |
| 10,179,036 B2* | 1/2019 | Lee | A61C 7/22 |
| 10,278,791 B2* | 5/2019 | Schumacher | A61C 7/20 |
| 2005/0003318 A1 | 1/2005 | Choi et al. | |
| 2005/0181332 A1 | 8/2005 | Sernetz | |
| 2005/0277083 A1 | 12/2005 | Lai | |
| 2006/0078688 A1* | 4/2006 | DeSimone | C08F 2/46 427/496 |
| 2006/0275731 A1* | 12/2006 | Wen | A61C 7/08 433/24 |
| 2007/0231765 A1* | 10/2007 | Phan | A61C 19/003 433/6 |
| 2010/0015565 A1* | 1/2010 | Carrillo Gonzalez | A61C 5/00 433/7 |
| 2010/0190128 A1* | 7/2010 | Wool | A61C 7/20 433/20 |
| 2011/0270583 A1 | 11/2011 | Getto et al. | |
| 2011/0311932 A1* | 12/2011 | Parker | A61C 7/12 433/9 |
| 2012/0028221 A1* | 2/2012 | Williams | A61C 7/00 433/215 |
| 2013/0177862 A1* | 7/2013 | Johnson | C22F 1/00 433/20 |
| 2014/0154637 A1* | 6/2014 | Hansen | A61C 7/20 433/20 |
| 2014/0234527 A1 | 8/2014 | Huang et al. | |
| 2016/0058527 A1 | 3/2016 | Schumacher | |
| 2016/0242870 A1* | 8/2016 | Matov | A61C 7/08 |
| 2017/0156823 A1* | 6/2017 | Roein Peikar | A61C 7/28 |
| 2017/0367791 A1* | 12/2017 | Raby | A61C 7/002 |
| 2020/0315747 A1* | 10/2020 | Lai | A61C 7/002 |

FOREIGN PATENT DOCUMENTS

| | | |
|---|---|---|
| EP | 2423338 A1 | 2/2012 |
| WO | 2011036249 A1 | 3/2011 |

OTHER PUBLICATIONS

Corresponding International Application, Application No. PCT/EP2017/061661 Search Report, dated Jul. 26, 2017, 6 Pgs.

* cited by examiner

ORTHODONTIC SHAPE MEMORY BAND

TECHNICAL FIELD

The invention relates to an active, semi-passive or passive shape memory orthodontic appliance and to a method for designing such an appliance.

PRIOR ART

A passive orthodontic appliance or "retainer" is an appliance intended to hold a patient's teeth in position, usually after an active orthodontic treatment.

A passive orthodontic appliance exhibits the disadvantage of maintaining the small defects rather than correcting them. Furthermore, if a hard piece of food bends the brace in the region between the teeth, the brace becomes active and brings about a loss of tooth alignment.

An active orthodontic appliance is an appliance intended to move the malpositioned teeth of a patient.

The most widespread orthodontic appliance, the "multi-fixings" appliance, is made up of "brackets" bonded to the teeth and into which an archwire is introduced.

The action of multi-fixings active orthodontic appliances results in a set of forces exerted on the teeth, via the archwires, which cause the teeth to move and become aligned.

In general, alignment is obtained by the action of a sequence of archwires which have specific roles:
  archwires made of nickel/titanium alloy:
    round section: alignment using a succession of archwires of increasing round cross section and leveling of the teeth of the same dental arch;
    rectangular section: correction of the main axis of the teeth (or torque);
  rectangular section archwires made of steel: correction of torque and of offsets between the dental arches through the action of intermaxillary elastics;
  rectangular section archwires made of TMA (titanium and molybdenum alloy): completing movements in all directions in space.

Shape memory materials are widely used in orthodontics. These materials are described in particular in the report entitled "Alliages à mémoire de forme [Shape memory alloys]"—CARMA (CENTRE D'ANIMATION REGIONAL EN MATERIAUX AVANCES)—update of December 2001, or in the document entitled "Les alliages NIckel-Titane (NiTi) [Nickel-titanium (NiTi) alloys]" by L. Jordan, P. Rocher, from the Société Francophone de Biomatériaux Dentaires [Francophone society of dental biomaterials] (2009-2010). There is also an AFNOR standard: "Alliages à mémoire de forme: Vocabulaire et mesures [Shape memory alloys: terminology and measurements]" (classification index: A 51-080), April 1991.

Steel alloys offer the archwire rigidity that allows the use of intermaxillary elastics without unwanted side effects.

TMAs allow the orthodontist to perform finishing bends with lower forces than using steel, which the patients are better able to tolerate.

The near-standardized use of this sequence of archwires exhibits the following disadvantages:
  the round-section first arch wires do not allow alignment in all directions in space, particularly for corrections of torque, thus lengthening the overall treatment time;
  numerous orthodontist appointments are needed, particularly for changing the archwires. These changes often cause the patients to feel pain because a sequence of archwires may generate discontinuous forces;
  risk that the brackets may become detached or the archwires may slip, exposing the patient's cheeks to lesions;
  this is a very routine repetitive action for orthodontists to perform;
  need to carry out time-consuming finishing bends.

There is therefore a need for an orthodontic appliance that does not exhibit these disadvantages.

One object of the invention is to meet this need, at least in part.

SUMMARY OF THE INVENTION

The invention proposes an orthodontic appliance comprising a one-piece shape memory band the cross section of which can vary according to the longitudinal position of said cross section, and comprising a bonding zone configured so as to exhibit a shape substantially identical to that of a tooth.

As will be seen in greater detail further on in the description, modifying the cross section along the band advantageously allows forces to be applied in several directions in space right from the start of the treatment. These forces may be adapted according to the size of the roots of the teeth that are to be moved. As a result, it is possible to shorten the treatment time and to limit the number of orthodontist appointments.

For preference, all the bonding zones have a shape substantially identical to that of a corresponding tooth, namely are "made to measure" and specifically tailored to the patient.

Furthermore, the shape of the bonding zone allows the shape memory band to be fixed "directly" to the teeth. The orthodontic treatment is advantageously simplified as a result.

Finally, the treatment can be more precise, thereby making it possible to limit the pain and hyalinization phenomena in the patient.

An orthodontic appliance according to the invention may also exhibit one or more of the following optional and preferred features:
  the contour of the cross section and/or the angular position of the cross section about the main direction of the cross section is (are) able to vary according to the longitudinal position of said cross section;
  the nature of the material or materials that define the cross section and/or the arrangement of the materials that define the cross section is (are) able to vary according to the longitudinal position of said cross section;
  the cross section comprises first and second zones defined by the one same material, the properties of the material defining the first zone differing from those of the material defining the second zone;
  said different properties result from different eat treatments according to the zone considered;
  the cross-sectional area and/or the composition of the material or materials that define the cross section and/or the mechanical properties of the material or materials defining the cross section is (are) able to vary according to the longitudinal position of said cross section;
  the variation in cross section along the main direction X is progressive over more than 1%, preferably over more than 5%, of the length of the shape memory band;
  the variation in cross section comprises a thinning;
  at least two portions of the shape memory band, each one representing more than 5% of the length of the shape memory band, exhibit cross sections which differ from those of the adjacent portion(s);

the shape memory band exhibits a cross section which varies progressively, along the main direction X, over more than 50%, preferably more than 60%, preferably more than 70%, preferably more than 80%, preferably more than 90%, preferably substantially 100% of the length of said shape memory band;

the inter-fixings portions of the shape memory band exhibit a cross section which varies progressively, along the main direction X, over more than 50%, preferably more than 60%, preferably more than 70%, preferably more than 80%, preferably more than 90%, preferably substantially 100%, of the total length of all of the inter-fixings portions combined;

the shape memory band exhibits a cross section which varies progressively, along the main direction X, over more than 50%, preferably more than 60%, preferably more than 70%, preferably more than 80%, preferably more than 90%, preferably substantially 100%, of the total length of all of its fixing portions combined;

the shape memory band comprises at least one region made from a material chosen from the group formed by nickel titanium NiTi, CuAlZn and thermal CuNiAl alloys, and steels;

the orthodontic appliance comprises fixing portions and inter-fixings portions, said fixing portions and inter-fixings portions succeeding one another in the main direction of the shape memory band and being made of NiTi alloy or of steel; however, for preference, the fixing portions and the inter-fixings portions are made of shape memory alloy, preferably the same shape memory alloy, making production easier and eliminating the risks associated with the presence of two different metals inside the mouth;

the orthodontic appliance comprises attachment portions made from a material that has no shape memory and inter-fixings portions made from a shape memory material, said fixing portions and inter-fixings portions succeeding one another in the main direction of the shape memory band;

the orthodontic appliance also comprises a reinforcer, preferably made of steel, and the shape memory band comprises a slot in which the reinforcer can be housed in order to stabilize the shape of said shape memory band;

each inter-fixings portion defines, at least on the side not facing toward the teeth in the service position, a convex exterior surface that has no sharp corners.

Another subject of the invention is a method for producing a band of an orthodontic appliance according to the invention, said method comprising the following steps:

a) determining an orthodontic treatment suitable for treating the teeth of a patient;

b) determining a set of forces to be exerted locally on said teeth in order to obtain said orthodontic treatment and the shape of the surface of the teeth to which bonding zones of said shape memory band are to be bonded;

c) producing said shape memory band, the local cross section of said memory band, and in particular the local cross section of the inter-fixings portions of said memory band, being determined according to said forces and in such a way as to define bonding zones substantially identical to the surfaces of said teeth to which they are to be bonded.

A method according to the invention thus makes it possible to produce an orthodontic appliance the shape and action of which are tailored to the individual.

A method according to the invention may also exhibit one or more of the following optional and preferred features:

said variation relates to the contour of the cross section and/or to the angular position of the cross section about the main direction X and/or to the nature of the material or materials that define the cross section and/or to the arrangement of the materials that define the cross section, and/or to the properties of the material or materials that define the cross section;

in step c), a shape memory band is produced of which no portion representing more than 10%, more than 5%, more than 2% or more than 1% of the length of the band exhibits a cross section that is constant; the tailoring of the cross section to suit the set of forces to be exerted locally is therefore advantageously very precise;

in step c), a shape memory band is produced of which the cross section, particularly and preferably the contour of the cross section, varies, preferably progressively, along the main direction X of said shape memory band, over more than 50%, preferably more than 60%, preferably more than 70%, preferably more than 80%, preferably more than 90%, preferably substantially 100% of the length of said shape memory band;

in step c), the local cross section of an inter-fixings portion extending between first and second said bonding zones succeeding one another in the main direction X is varied locally according to the forces that are to be exerted, in the three dimensions in space, on first and second teeth to which said first and second bonding zones are respectively intended to be bonded;

in step c), use is made of a 3D printer.

In one embodiment, in step c), one or more regions of the shape memory band is or are heat treated so as to locally reduce the forces exerted on the teeth in the service position.

For preference, in step c), the intensity (duration and/or temperature) of the heat treatment of a region of the shape memory band is dependent on the distance, from the incisors of said patient, of the teeth in the vicinity of said region in the service position.

BRIEF DESCRIPTION OF THE FIGURES

Further features and advantages of the invention will become further apparent from reading the detailed description which follows and from studying the attached drawing in which:

FIGS. 7 (7a and 7b) illustrates the operation of an orthodontic appliance according to the invention.

In each of FIGS. 2b-2j, the shape on the left represents the cross section in the transverse plane P1 of FIG. 2a, the shape in the middle represents the cross section in the plane P2 and the shape on the right represents the cross section in the plane P3.

These shapes are provided by way of illustration. In practice, the angles and sharp corners are preferably rounded for better comfort.

In the various figures, members that are identical or analogous are identified by identical references.

Definitions

A "band" is a component the length of which is more than 3 times, preferably more than 5 times, greater than the greatest width and/or than the greatest thickness. The ratio between the greatest width and the greatest thickness is not limited.

The "length" is measured in the main direction X, preferably curved, of the shape memory band.

A "cross section" is a section in a plane perpendicular to the main direction X.

A "portion" of the shape memory band is a segment of this band delimited by two cross sections.

Figure 2B:
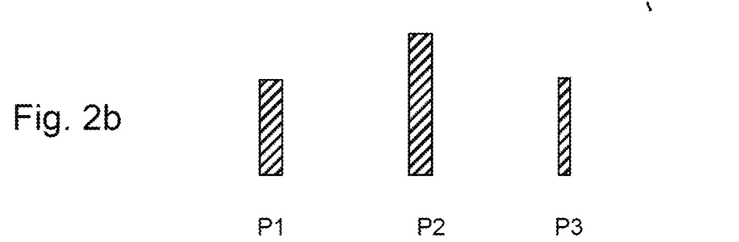
FIGS. 2b-2j and 4 illustrate a number of examples of variations in the cross section of a shape memory band along the main direction X, FIG. 6 schematically depicts one example of a shape memory band according to the invention, comprising a longitudinal reinforcer.
Figure 2C:
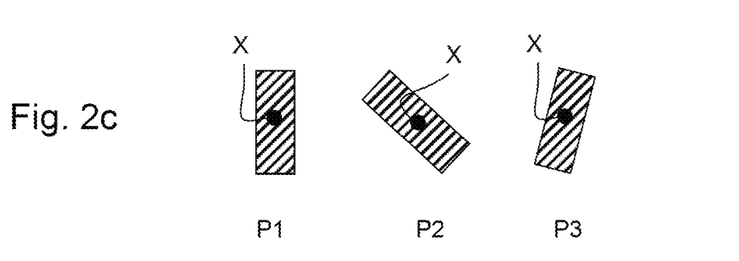
Figure 2D:
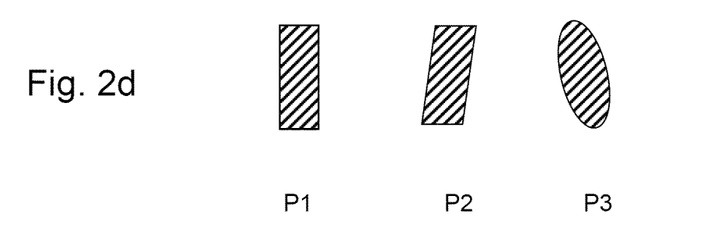
Figure 2E:
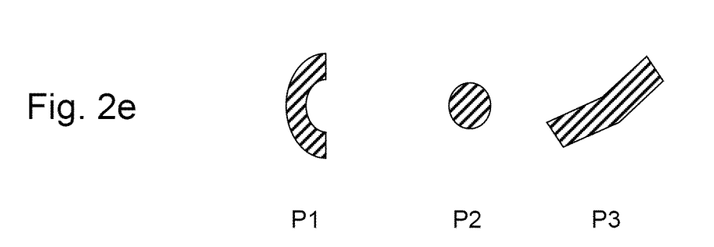
Figure 2F:
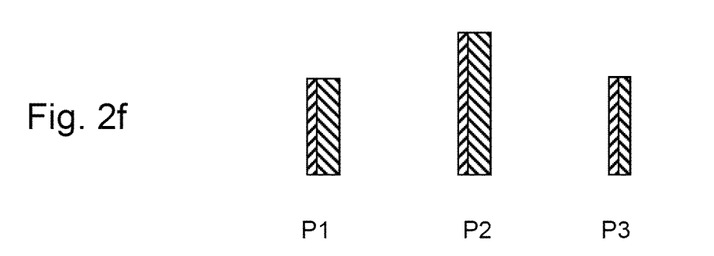
Figure 2G:
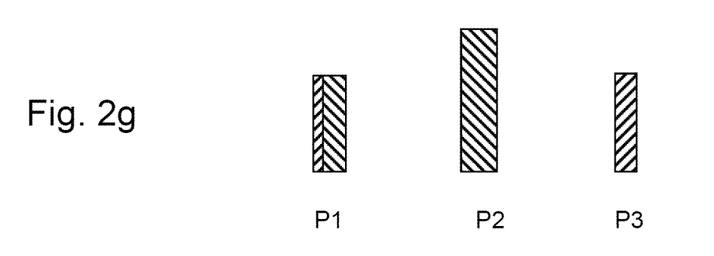
Figure 2H:
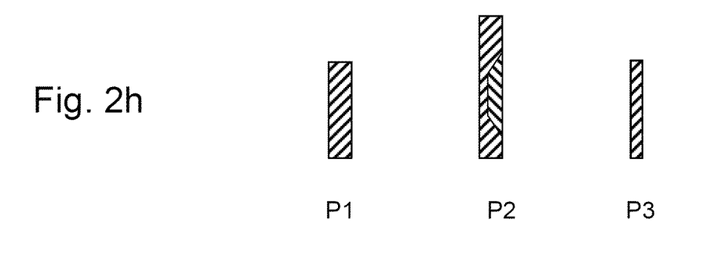
Figure 2I:
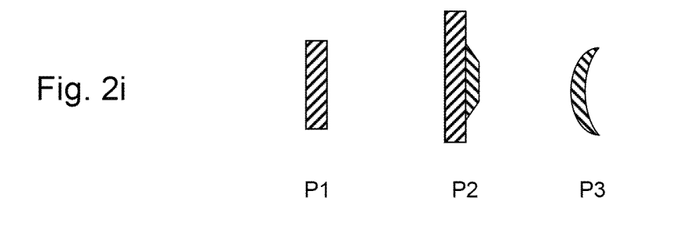
Figure 2J:
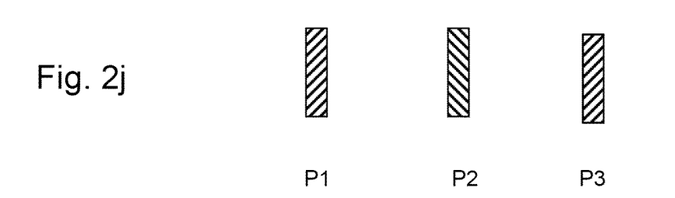
Figure 3A:
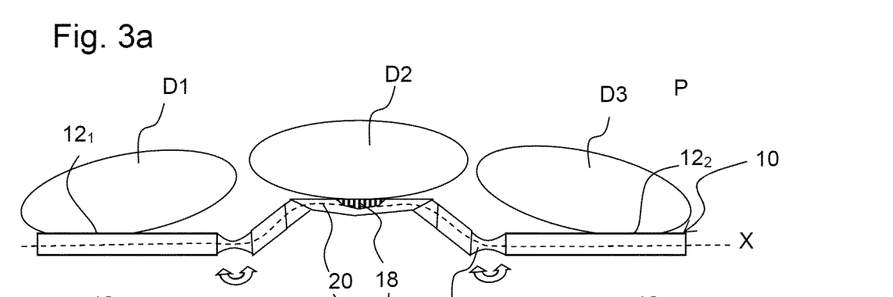
Figure 3B:
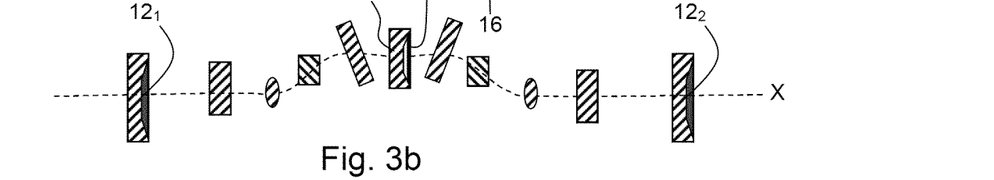
Figure 4:
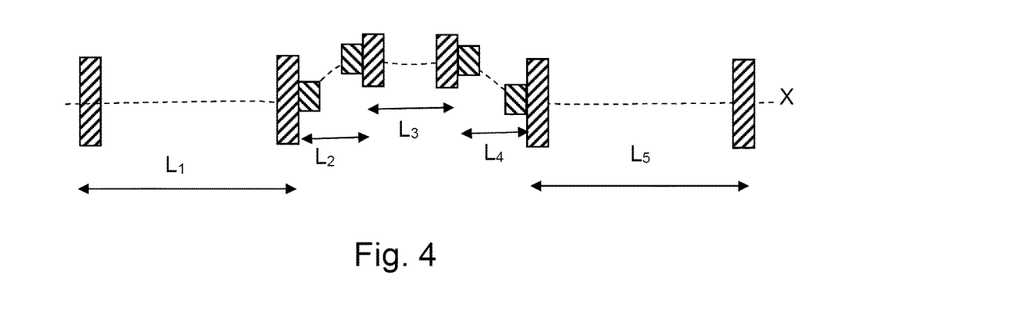

A graphic depiction of the cross sections of a shape memory band along the main direction X as depicted in FIG. 2, 3b or 4 is referred to as a "cross section profile".

A "progressive" or "continuous" variation is a smooth variation, which means to say one with no sudden changes.

The verb "to comprise" is to be interpreted in the broad, non-exclusive sense.

What is meant by an "orthodontist" is any professional involved in an orthodontic treatment. This then includes the manufacturer of the orthodontic appliance, even if he has not qualified as an orthodontist.

DETAILED DESCRIPTION

Orthodontic Appliance

Figures 1, 2A:
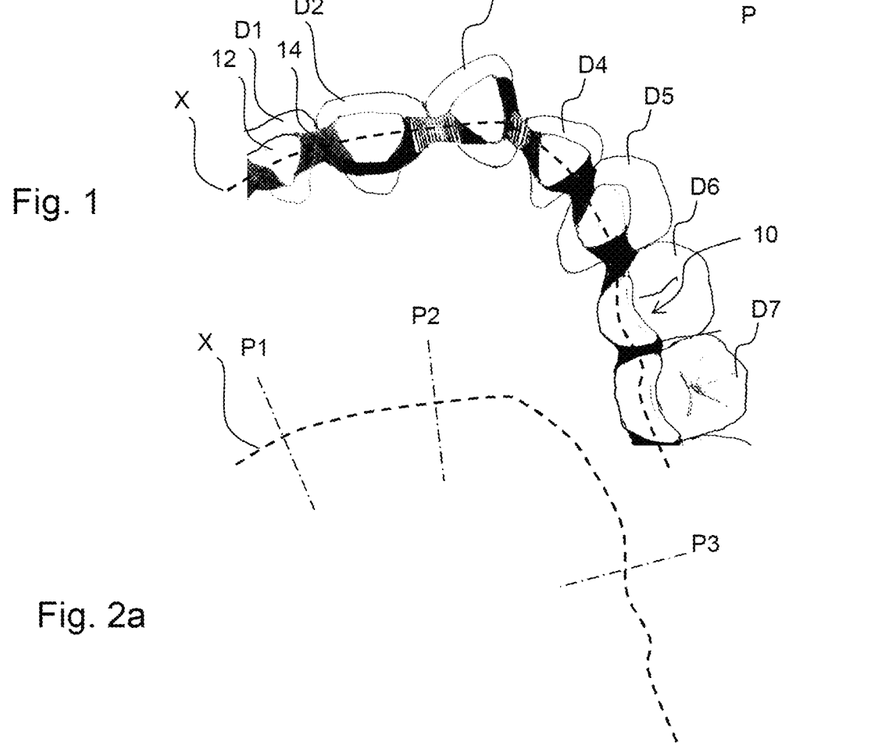
FIGS. 1, 3a, 3b, 5a, 5b, and 5c each depict an overview of an orthodontic appliance according to the invention, in its service position (position in which the orthodontic appliance exerts its action on the teeth)
FIG. 2a depicts an example of a main direction X of an orthodontic appliance according to the invention and three planes P1, P2 and P3 in which a shape memory band of an orthodontic appliance according to the invention has been sectioned for FIGS. 2b to 2j.

FIG. 1 depicts a first example of an orthodontic appliance according to the invention, made up of a shape memory band.

The orthodontic appliance is one piece, which means to say that it is made up of just one piece, namely the shape memory band.

The shape memory band extends along a main direction or "axis" X, depicted in broken line, preferably substantially in an overall plane P (the plane of the page in FIG. 1). The shape memory band is preferably shaped in such a way that, in the service position, the overall plane P is substantially parallel to the occlusion plane.

It is depicted in a service position in which it exerts an action to move teeth $D_i$ (i=1 . . . 7) (hereinafter referred to generically as "D"), relative to one another.

Figure 5A:
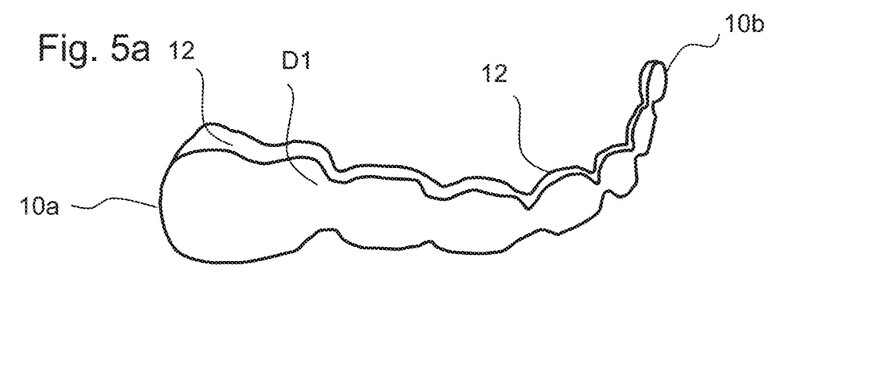
Figure 5B:
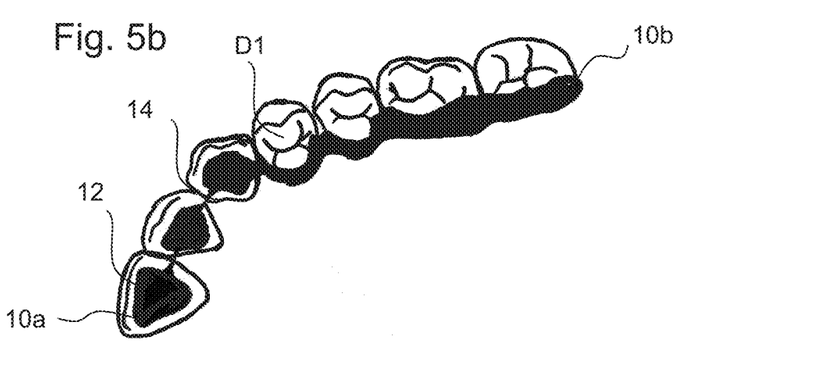
Figure 5C:
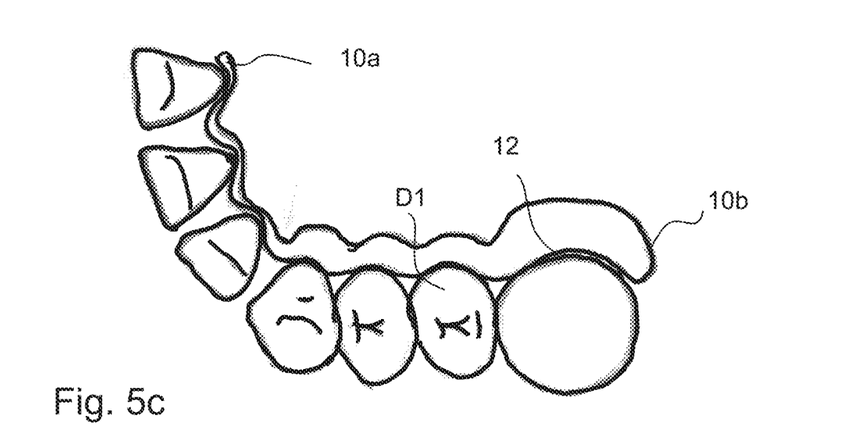

For preference, as depicted in FIGS. 5a to 5c, at least one, and preferably each, of the ends 10a and 10b of the shape memory band exhibits rounded shapes, preferably without any sharp edge corners. Thus, in the event of detachment, the risk of injuring the patient is therefore limited.

One method for rounding the shapes is to dip the band in acid in order to blunt the sharp corners.

Along the main direction X, attachment portions 11 and inter-attachments portions or "bridges" 14 succeed one another.

Figure 6:
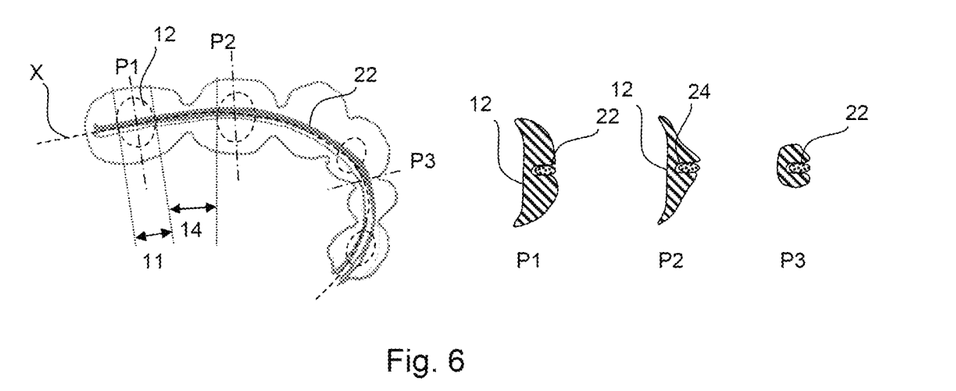

An attachment portion 11 is a portion of the shape memory band which comprises a bonding zone 12 or "back face of the attachment portions" intended for fixing the shape memory band to the teeth. Along the main direction X, a fixing portion 11 is delimited by the boundaries of the bonding zone 12 (FIG. 6).

Each bonding zone 12 is fixed, preferably rigidly, "directly" to a tooth D, namely without the intermediary of brackets, preferably to the back face of the teeth, namely the lingual face of the teeth, and this advantageously renders the shape memory band invisible.

The shape memory band can also be bonded to the vestibular face of the teeth, notably when the clinical situation so indicates.

Bonding may be performed in particular by means of a bonding composite commonly used in orthodontics, for example Transbond XT (3M), FUJI ORTHO LC, or RELIANCE, which is chemically polymerizable.

In one preferred embodiment, all the bonding zones are configured in such a way as to exhibit a shape substantially identical to that of the teeth D to which they are intended to be fixed. This shape may be determined as the result of a three dimensional scan of the patient's teeth or of measurements taken from a plaster model of the patient's teeth, obtained from at least one impression. The shape of the bonding zones is preferably "tailored to the individual", which means to say specifically tailored to the dimensions and the arrangement of the teeth of a particular patient. This improves the effectiveness of the orthodontic appliance.

The bonding zones preferably have a surface finish that improves the bonding. A bonding zone may in particular exhibit a textured surface, particularly a surface which has been sandblasted or knurled, for example in the form of a grid pattern. In one embodiment, the bonding zones are laser treated to create microreliefs, thereby increasing the area of contact between the bonding zone and the adhesive. The textures conventionally applied to the bonding surfaces of the brackets of conventional orthodontic appliances may be applied to a bonding zone to increase the bonding area.

For preference, at least part of the bonding zones 12, preferably each of the bonding zones 12, exhibits a surface area greater than 1 mm$^2$, preferably greater than 2 mm$^2$, preferably greater than 5 mm$^2$.

A bridge 14 is a part of the orthodontic appliance which is not bonded, directly or indirectly, to a tooth. A bridge 14 may extend between two teeth which may or may not be adjacent.

At least part of the shape memory band is made from a shape memory material.

The shape memory material may in particular be selected from the group formed by the materials that exhibit superelasticity, single and/or two-way shape memory properties.

The shape memory material may in particular be chosen from the group formed of nickel titanium NiTi, CuAlZn and CuNiAl alloys, preferably from NiTi alloys.

The shape memory material may also be a biocompatible polymer.

Nickel-titanium alloys are preferred materials.

In one embodiment, the shape memory band comprises one or more rigid reinforcers 22 and/or hooks, preferably made of steel or of nickel-titanium with reduced shape memory, allowing the attachment of intermaxillary elastics.

For preference, in order to avoid any bi-metal effects, the reinforcer and/or the hook are made from one of the metals involved in the shape memory alloy of the band.

The presence of a reinforcer is aimed at avoiding unwanted deformation of the shape memory band when using accessories that generate a force beyond the elastic domain of certain portions of the band, notably when using intermaxillary elastics.

A reinforcer 22 is preferably arranged facing a bonding zone, on the opposite side of the band to said bonding zone, preferably in a concavity formed in the band, for example a slot 24.

In one embodiment, a reinforcer extends along the shape memory band over a length greater than 1 cm, greater than 2 cm, or greater than 5 cm.

The reinforcer may adopt the form of a wire, particularly the form of an archwire.

The reinforcer comprises at least two rigid wires or "bars" which can be inserted, by sliding, into a slot 24.

The reinforcer may be embedded within the shape memory band. In one embodiment, it is arranged in a longitudinal slot (which means to say one substantially parallel to the main direction X), preferably formed on the outside face of the shape memory band, which means to say on that face of the shape memory band which, in the service position, is oriented toward the inside of the mouth.

In one preferred embodiment, the reinforcer is not placed in the longitudinal slot until after the teeth have been repositioned, namely after the shape memory band has ceased to be active and has adopted a stable shape. The longitudinal slot can thus be used to house a reinforcer, preferably made of steel or of nickel-titanium with reduced shape memory, allowing the shape memory band to be converted into a passive orthodontic appliance. Advantageously, the same appliance can therefore be used in succession actively and then passively. Conversely, a passive appliance can be activated by removing a reinforcer.

The hooks are positioned at locations specific to the intended treatment.

Hooks may be positioned in particular on a reinforcer and/or in a fixing portion.

In one preferred embodiment, the shape memory band is made entirely from a shape memory material, for example NiTi, with the possible exception of said reinforcers and of said hooks.

For preference, the shape memory band is obtained by additive manufacture, using a 3D metal printer. It therefore has no welds or other means of attachment between the various parts of the shape memory band.

The shape memory band may also be produced by laser cutting from a sheet of alloy, followed by bending by a robot or an automated machine.

For preference, the shape memory band is configured to withstand the parasitic effects of intermaxillary traction elastics. For preference, for this purpose it has local thickened regions and/or reinforcers. For preference, it also comprises hooks to which to attach such elastics.

In one embodiment, the shape memory band has a cross section that can vary over at least part of its length. Thus, there are at least two cross sections which differ from one another.

The variation in cross section may comprise or even consist in a variation in shape, namely a variation:
- in the contour of the cross section, for example because the contour becomes rounded; and/or
- in the angular position of the cross section about the main direction, namely the orientation thereof.

The variation may comprise or even consist in a variation in composition, which means to say a variation:
- in the nature of the material or materials that define the cross section; and/or
- in the arrangement of the materials that define the cross section.

The variation may also comprise a variation in the properties of the one same material, particularly under the effect of heat treatments that differ according to the zones of the cross section considered.

Variations in Shape

For preference, the shape memory band exhibits a cross section of which the shape varies in such a way as to exert a field of forces, in the three dimensions of space, corresponding to an individualized orthodontic treatment, which means to say one determined according to the particular patient. For example, conventionally, the forces that are to be exerted on the molars are higher than the forces that need to be exerted on the incisors. A difference in the cross-sectional shape of the inter-fixings portions exerting their actions on the molars and on the incisors advantageously allows the forces to be adapted accordingly.

For preference, the shape memory band exhibits a cross section the shape of which varies, preferably progressively, along the main direction X, over more than 50%, preferably more than 60%, preferably more than 70%, preferably more than 80%, preferably more than 90%, preferably substantially 100% of the length thereof. In other words, the combined length of the portions of the shape memory band that exhibit a cross section of constant shape preferably represents less than 50%, preferably less than 40%, preferably less than 30%, preferably less than 20%, preferably less than 10%, preferably substantially 0% of the length of the shape memory band.

As illustrated in FIG. 5, in a preferred embodiment, the variation in the cross-sectional shape is continuous over the entire length of the shape memory band. It may thus be perfectly tailored to the needs of one particular patient.

In the preferred embodiment of FIG. 5, the shape memory band is preferably one piece. Tests have demonstrated that it is considerably easier to control the action of the shape memory band using this approach, particularly in comparison with an orthodontic appliance comprising an archwire fixed to brackets.

For preference, the variation in the cross-sectional shape along the main direction X is progressive. Advantageously, a progressive variation in shape avoids the creation of a sharp corner liable to injure the patient.

In one embodiment, the variations in cross section comprise a modification to the contour and/or to the orientation with respect to the main direction X.

The variation in contour may lead to a modification to the overall shape of this contour. For example, it may be parallelepipedal in a first portion of the shape memory band and then circular in another portion.

In FIG. 2d for example, the overall shape of the cross section varies along the main direction X, particularly in at least one inter-fixings portion.

In one embodiment, the contour of the cross section of the shape memory band, particularly in at least one fixing portion, locally exhibits a concave curvature, at least on the "interior" side, which means to say the side oriented toward the teeth in the service position, as depicted in FIG. 2e (shapes on the left and on the right). This concave curvature may change along the main direction X. In particular, it may serve to define a bonding zone.

For preference, the contour of the cross section of the shape memory band, particularly in at least one inter-fixings portion, preferably in each inter-fixings portion, locally exhibits a convex curvature on the "exterior" side, which means to say on the side not facing toward the teeth in the service position, for example a cross section of hemidiscoid, half-moon overall shape. Locally, the shape memory band is, for example, a half-bead.

The risk of injury to the patient is thereby reduced.

For preference, at least the fixing portions have a concave curvature on the interior side and a convex curvature on the exterior side, for example a cross section in the overall shape of a crescent moon. For preference, at least the inter-fixings portions have a convex curvature on the exterior side.

The variation in contour may lead to a variation in cross-sectional area.

In FIG. 2b, the overall shape of the cross section remains rectangular but the width and length of the section can vary according to the position along the main direction X.

In one embodiment, the variation in contour may consist in a simple homothetic modification to the contour.

In FIG. 2c, the contour of the cross section remains constant, but the orientation about the main direction X varies according to the position along the main direction X.

In one embodiment, the variation in cross section necessarily comprises a change in contour, with or without a change in cross-sectional area, independently of any potential variations in orientation there might be about the main direction X.

In one embodiment, the variation in cross section is a thinning, preferably in a lateral direction, namely a direction parallel to the overall plane P.

The shape memory band and, in particular, an inter-fixings portion, may for example adopt the shape of a right cylinder, with or without bends, possibly twisted on itself, of a spring, exhibiting a space opening or closing loop, of an intrusion loop (force on the tooth in the direction of the bone pocket), of an egression loop (opposite action to an ingression), of a loop designed to apply torque (edge torsion on an inter-fixings portion, as if twisting an archwire).

The shape memory band may be made of a single shape memory material (FIGS. 2b to 2e).

For preference, and particularly when the shape memory band is made of one single shape memory material, it preferably has thickened regions in the fixing portions. For preference, the maximum thickness of a fixing portion, preferably of an arbitrary fixing portion, is greater than the maximum thickness of the adjacent inter-fixings portion or portions, namely to the portion or portions to which said fixing portion is connected.

Advantageously, an additional thickness makes it possible to limit the deformations liable to cause detachments of the bonding zones.

In one embodiment, the additional thickness of one fixing portion is enough to reduce, or even to substantially eliminate, the behavior of the shape memory of the material of which it is made. In one embodiment, the shape memory band is thus made up of inter-fixings portions which exhibit shape memory and of fixing portions which, although made from a shape memory material, exhibit appreciably no shape memory.

A thickening of several adjacent fixing and inter-fixings portions also makes it possible to form an anchor zone which is substantially nondeformable. An anchor zone may in particular be used to apply traction to one or more teeth the anchor strength of which is lower.

Simple tests make it possible to determine the required additional thicknesses.

The variations in cross section, particularly the variations in cross-sectional shape, advantageously allow the force exerted locally on the teeth to be correctly tailored to suit.

Variations in Heat Treatment

The inter-fixings portions may also undergo heat treatments that reduce the forces exerted on the teeth, while at the same time maintaining the shape memory properties.

Such heat treatments are, in particular, described in the report "Alliages à mémoire de forme [Shape memory alloys]"—CARMA (CENTRE D'ANIMATION REGIONAL EN MATERIAUX AVANCES)—update of December 2001.

In one embodiment, the mesial regions of the shape memory band, which means to say the ones intended to be closest to the lips in the service position, undergo a heat treatment. For preference, the shape memory band locally receives heat treatments the durations of which increase with increasing proximity of the treated region to an end of said band that is distant from the lips in the service position.

Such a difference in heat treatment is particularly advantageous when the anterior sector of a dental arch, made up of single-rooted teeth, needs to be subjected to lower forces than the posterior sector. A modification to the cross-sectional shape is advantageously not always indispensable.

Variations in Composition

In one embodiment, as depicted in FIGS. 2f to 2j, the shape memory band comprises several materials, at least one of which is a shape memory material. In one embodiment, all the materials are shape memory materials.

One or more materials can be seen in a cross section. For example, in FIG. 2j, the contour of the cross section is constant, but the nature of the material which defines the cross section is able to vary along the main direction X. Each cross section however is defined by just one single material.

In one embodiment, along the main direction X, the shape memory band comprises a succession of portions made from a shape memory material and of portions made from a material that has no shape memory.

For preference, the fixing portions 11 are included in the portions made from a material that has no shape memory. The material that has no shape memory may in particular be a steel. Advantageously, the shape of the fixing portions 11 is thus stable, thereby limiting the risks of detachment or even of disengagement.

The shape memory material is preferably a nickel-titanium alloy. For preference, the portions made from a shape memory material are included in respective inter-fixings portions.

In one embodiment, along the main direction X, the shape memory band comprises, over at least part of its length, a succession of fixing portions made of steel and of inter-fixings portions made of NiTi.

In one embodiment, as depicted in FIGS. 2g to 2i, a cross section may be defined by several materials. In these figures, the nature and/or the arrangement of the material or materials that define the cross section are able to vary along the main direction X.

Various materials may be arranged in the form of superposed layers, for example in the overall plane P or in a plane perpendicular to the overall plane P, as depicted in FIG. 2f.

The variation in the nature of a material may be continuous, the content of this material being progressively increased or decreased. The variation in the behavior of the shape memory band 10 may in particular result from a progressive variation in the constitution of the shape memory alloy.

In one embodiment, the posterior regions of the shape memory band have a different composition from the anterior regions. Such a difference in composition is particularly advantageous when the anterior sector of a dental arch, made up of single-rooted teeth, needs to be subjected to lower forces than the posterior sector. A modification to the cross-sectional shape is advantageously not always indispensable.

FIG. 3 depicts another example of an orthodontic appliance according to the invention.

In FIG. 3, the one-piece shape memory band 10 extends opposite three teeth D1, D2 and D3. It is bonded, by bonding zones $12_1$ and $12_2$, to the exterior teeth D1 and D3, the bonding zones $12_1$ and $12_2$ having shapes that complement the surfaces of the teeth D1 and D3 against which they rest.

The shape memory band is shaped to act on the tooth D2 that is to be moved as it returns to its stable position. For preference, the shape memory band presses against the tooth D2.

FIG. 3b depicts the way in which the cross section evolves along the main direction X. The shape memory band 10 in particular comprises thinned portions 16 in which the cross-sectional area is reduced.

The reduction in one dimension of the cross section of the shape memory band, and particularly in its thickness, can be utilized in particular for inter-fixings portions, if the movements that are to be applied are simple and low in intensity. This is because the reduction in a dimension is accompanied by a reduction in the force applied. The application of a low intensity force is particularly sought after in the anterior dental sectors in which the teeth are single rooted and the roots are relatively small. The reduction in the intensity of the forces applied may also be the result of a heat treatment of the inter-fixings portions, as explained above.

For preference, the reduction in the dimensions of the cross section is performed in a favored direction, for example in a direction in the overall plane P and perpendicular to the overall direction X. The shape memory band thus has a tendency to bend about an axis perpendicular to the overall plane P.

The orientation of the cross section about the main direction X also makes it possible to orient the flexing of the band 10.

In the central region, the structure is composite, it being possible for the portion 18 to be made of a first shape memory material and for the second portion 20 to be made of a second shape memory material.

A composite structure may also be the result of a particular property of a region resulting from the application of a particular treatment, for example a specific heat treatment, making it possible to reduce the forces exerted. For example, a heat treatment may be applied to an anterior region of the shape memory band, so that the forces delivered are weak, and thus ensure a significant amount of deflection of an inter-fixings portion. The exerting of weaker forces may in particular be useful for the incisors, which have small roots.

Whatever the embodiment, for preference, at least two, and preferably more than two, more than three, more than four, more than five or even more than eight portions of the shape memory band, each one representing more than 1%, preferably more than 5%, preferably more than 10%, or even more than 20% of the length of the shape memory band, have cross sections that differ from those of the adjacent portion or portions. In FIG. 4, for example, the cross sectional profile comprises five portions $L_1$ to $L_5$ each of which exhibits a cross section that differs from those of the adjacent portion or portions.

In one embodiment, the shape memory band comprises at least one, preferably at least two, preferably more than two, more than three, more than four, more than five, or even more than eight portions in which the cross section is continuously variable, each of said portions extending over more than 1%, preferably more than 5%, preferably more than 10%, or even more than 20% of the length of said band. For example, the shape memory band depicted in FIG. 3b has a single portion in which the cross section varies continuously along the main direction X.

For preference also, no portion of the shape memory band that represents more than 80%, more than 60%, more than 40%, more than 20%, more than 10%, more than 5% or even more than 2% of the length of the band has a section that is constant. In other words, there is no long portion of band of constant section.

FIGS. 5a to 5c illustrate variations in the cross section of the band in terms of height (FIG. 5a) or of thickness (FIG. 5c). The transverse dimensions of the band may increase or decrease as the ends of the band are approached.

Production Method

The production of a shape memory band according to the invention preferably comprises steps a) to c) described above.

In step a), the orthodontist determines the malpositioned teeth of the patient and how these need to be moved in order to achieve the desired arrangement starting from an initial arrangement of said teeth. To do this, the orthodontist may take an impression of the teeth, make a plaster model of the teeth, and then evaluate how the various teeth need to be moved.

For preference, the orthodontist takes a three-dimensional scan of the patient's malpositioned teeth, so as to obtain an initial digital model of the teeth.

The orthodontist then performs a simulation, preferably a computer simulation, of the treatment so as to determine a set of movements and forces to be applied to said teeth in order to achieve said treatment.

He may in particular modify the initial digital model until he obtains a final digital model that corresponds to the desired arrangement of the teeth. A comparison between the final and initial digital models allows him to determine precisely the various movements required.

In step b), the orthodontist evaluates all the forces required to move the patient's teeth toward the desired final arrangement. For preference, he also determines the moment at which these forces need to be applied.

In step c), the orthodontist produces the orthodontic appliance, particularly the orthodontic band, so that he can exert all of the forces determined in step b) at the suitable moment.

In particular, the dimensions of the inter-fixings portions are tailored to suit the force or anchorage to be applied.

The purpose of the anchorage is to attach the shape memory band to one or more teeth which will be capable of remaining substantially unmoved. For preference, several teeth are rigidly fixed together, by means of an "anchoring portion" of the shape memory band. For preference, the anchoring portion is made of steel and/or has a cross section designed to limit its deformation, particularly an increased thickness. Tailoring of the cross section is particularly highly suitable when the shape memory band is made wholly from a shape memory material.

In steps b) and c), the orthodontist preferably uses a suitable computer program. In particular, in order to predict how an orthodontic appliance according to the invention will behave, namely to simulate and "program" the shape memory band, he may employ methods the principles of which are well known:

It is notably possible to theoretically model the behavior of the materials according to their environment, and in particular according to their interactions with other materials.

Alternatively, the behavior may be anticipated from various tests. Increasing the number of tests and analyzing same thus make it possible, empirically, to anticipate how a specific shape memory band might behave.

These two approaches, the theoretical and the empirical, lead to a digital model of the behavior of the shape memory band according to its environment and as a function of time. This model, which is said to be "predictive", makes it possible to foresee the action of a particular shape memory band. Conversely, in order to obtain a desired particular action, the predictive model allows the orthodontist, preferably assisted by the computer, to produce a shape memory band according to said desired action.

In practice, the orthodontist may create a digital model of a shape memory band that is to be tested and then, using the predictive model, simulate the action that this shape memory band will have on the teeth, as a function of time. He may thus, preferably assisted by the computer program, look for the band configuration best suited to the intended treatment.

The degree of precision in the empirical approach is generally inferior to that obtained using the theoretical approach. However, the empirical approach is simpler to implement.

In step c), the orthodontist may thus determine the local cross section of said band according to the force that is to be exerted locally and, for preference, according to the moment at which this force is to be exerted. For preference, the force to be exerted "locally" and therefore the "local" configuration of the cross section are evaluated for each of the teeth that are to be moved.

When designing the band, the width and thickness of said band can vary according to the intensity of the forces to be applied and according to the size of the root area and/or according to the inter-fixings distance. The shorter the inter-fixings distance, the greater the force, for the same thickness. These dimensions may also be increased without at the same time applying forces. In that case, on the other band, what is required is to prevent certain types of movement, notably unwanted movements of loss of anchorage, bowing effect, rabbiting, etc.

In order to produce the shape memory band, the orthodontist preferably uses a 3D printer. Such a printer advantageously allows a shape memory band of complex shape and/or made of several materials to be manufactured with a good degree of precision.

3D printing also allows immediate manufacture of the shape memory band to the shape required at the end of treatment.

As an alternative to 3D printing, metallurgical techniques may also be employed to produce a shape memory band according to the invention.

For preference, during manufacture, the orthodontist deactivates the shape memory by cooling below the corresponding threshold temperature. He then shapes the shape memory band, in three dimensions, to make it correspond to the initial state of the dental arch with its malpositions. For preference, the shaping is performed using a robot. The companies Sure Smile or Incognito offer robots capable of such shaping.

During a later step d), the orthodontist bonds the shape memory band while at the same time keeping the temperature below said threshold temperature.

Once bonded, the temperature of the band rises toward the patient's body temperature. The temperature therefore exceeds the threshold temperature, and this activates the shape memory and immediately generates customized forces to obtain a correction in the positioning of the teeth, in all three dimensions in space.

Figure 7A:
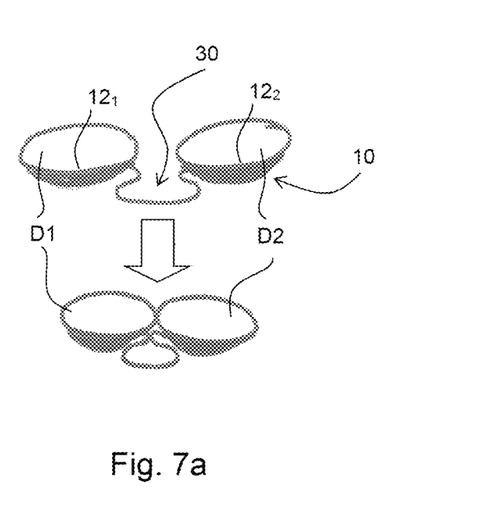

FIG. 7a illustrates how a shape memory band 10 can move two teeth D1 and D2 closer together. The shape memory band is bonded, by respective bonding zones $12_1$ and $12_2$ to faces of the teeth D1 and D2 respectively. The shape memory band has a loop 30 which, under the temperature conditions found in the mouth, has a tendency to close up, thus moving the teeth D1 and D2 toward one another.

Figure 7B:
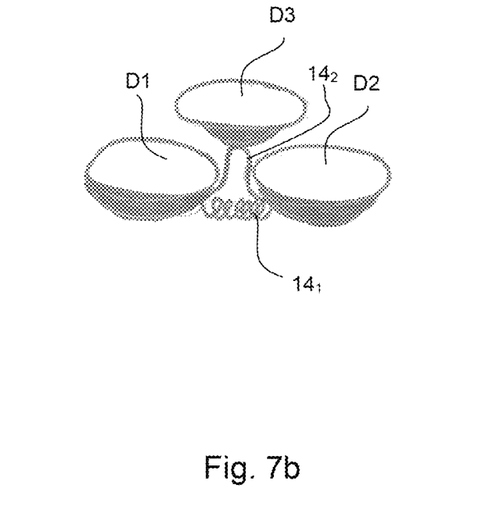

FIG. 7b illustrates a shape memory band that makes it possible at the same time to move teeth D1 and D2 apart, through extension of a shape memory portion $14_1$, and to align a tooth D3 with the teeth D1 and D2 by extension of a second shape memory portion $14_2$ fixed not only to the teeth D1 and D2 but also to the intermediate tooth D3. Unlike the shape memory band illustrated in FIG. 7a, the shape memory band depicted in FIG. 7b comprises loops which have a tendency to open when the shape memory band is placed inside the patient's mouth.

A shape memory band according to the invention may also act as a surgical guide for the placement of miniscrews. In particular, it is possible to print weld a bushing which is connected to the band by extensions. The bushing allows the introduction of a drill in order to drill a pilot hole. This step makes it easier for an anchoring miniscrew to be inserted along the correct axis and to the desired depth.

A shape memory band according to the invention may also define a channel section shape including such a guide. In that case, the bushing is embedded in the channel section.

The miniscrew can advantageously be fitted immediately after the band has been bonded. As is now clearly apparent, the invention provides a shape memory band that is tailored to the individual, which means to say programmed specifically for one particular orthodontic treatment. This programming makes it possible to ensure that, at any moment, the action of the orthodontic appliance will correspond precisely to the desired action.

The action of the orthodontic appliance may thus be optimized, for a rapid treatment and/or to limit the hyalinization phenomenon. Optimization also makes it possible to limit the number of modifications to the orthodontic treatment, and in particular, the number of orthodontic appointments.

Furthermore, unlike orthodontic treatments of the prior art, there is no need to multiply the number of orthodontic archwires in order to achieve tooth alignment.

In particular, the orthodontic appliance according to the invention conforms perfectly to the contours of the teeth that are to be aligned. It exerts forces of varying intensity according to the degree of malpositioning of the tooth and according to the root area of the teeth. The greater this root area, the more the forces that are to be applied increase.

Control of the forces applied during orthodontic treatment also limits the risk of detachment.

Furthermore, the shape memory band may advantageously be fixed directly to the teeth, thereby simplifying its positioning in the service position.

The orthodontic treatment is therefore quicker, more effective, and lower in cost.

Of course, the invention is not restricted to the embodiments described and depicted, which are provided for illustrative purposes only. In particular, the various variations described hereinabove can be combined.

Furthermore, an orthodontic appliance may comprise several shape memory ds according to the invention.

The orthodontic appliance may be an active, semi-passive or passive orthodontic appliance. In one embodiment, the orthodontic appliance is an orthodontic appliance that acts as a retainer, but which can be activated if necessary, in the event of undesired movement of the teeth.

The orthodontic appliance may be a semi-passive shape memory band that allows alignment to be maintained after an active treatment.

The shape memory band can be used exclusively for an active treatment, exclusively for retention or for a mixture of the two. The shape memory band aligns the teeth, and it is then cut on the distal side of the canines. The two lateral parts are detached, but the anterior part is left in place to act as a semi-passive or semi-active retainer.

In one embodiment, the shape memory band is used after a relapse. In particular, it can be used in instances in which a patient has already received an active treatment, then worn a retainer, where the retainer has become broken, and a relapse has occurred. In such cases, the production of the shape memory band makes it possible to correct the defects associated with the relapse and act as a retainer.

In one embodiment, the shape memory band is used at the end of active treatment in order to perform the necessary finishing operations and then act as a retainer. For example, Invisalign® treatments may leave small defects at the end of treatment. A shape memory band makes it possible to perform the finishing operations, and then acts as a retainer.

Semi-active retainers have existed since patent US2016058527A. The retainer reactivates if the teeth have a tendency to shift either toward their initial position or toward a different (neither initial nor final) position.

In the event of a shape memory band becoming detached from a tooth, there is the possibility of the tooth shifting again because it is no longer held in position. In that case, during a checkup appointment, the orthodontist may cool the inter-fixings zones adjacent to the zone that needs to be reattached. This cooling allows the shape memory band to be manipulated more easily so that it can be positioned in contact with the tooth which has shifted. After reattachment, the body temperature partially reactivates the shape memory band (retainer) and realigns the tooth. This procedure is far more rapid than the current practice whereby the doctor has to remove the entire retainer, reperform a short treatment by reattaching brackets, and then refit a conventional retainer.

Traditional retainers can deform plastically after the patient has bitten down onto a hard piece of food. In such cases, which are frequently a traditional retainer will switch from passive to active. However, the action of a deformed retainer tends toward malpositioning the tooth or teeth concerned.

A shape memory retainer band according to the invention may advantageously of its own accord recover its shape after deformation. Advantageously, the teeth have not had time to move before the shape memory band reverts to its service shape.

The invention claimed is:

1. A method for producing and applying a shape memory band of an orthodontic appliance, said shape memory band having a main direction X passing through the centers of the cross-sections of said shape memory band along the length of said shape memory band, said shape memory band being one piece, having a variation of a cross section according to the longitudinal position of said cross section, and comprising bonding zones configured in such a way as to exhibit a shape substantially identical to that of respective teeth, at least part of the shape memory band being made from a shape memory material, said method comprising the following steps:
   a) determining an orthodontic treatment suitable for moving the teeth of a patient in order to achieve a desired arrangement starting from an initial arrangement of said teeth;
   b) determining a set of forces to be exerted locally on said teeth, in a service position, in order to obtain said orthodontic treatment and determining the shape of the surface of the teeth to which bonding zones of said shape memory band are to be bonded;
   c) producing said shape memory band with a 3D printer, said shape memory material having an actual stable shape, the local cross section of said shape memory band being determined for the shape memory band to apply said forces when said shape memory band is in the service position and a memorized stable shape of said shape memory material, different than said actual stable shape, is active;
   said producing of said shape memory band being in such a way as to define bonding zones substantially identical to the surfaces of said teeth to which they are to be bonded, and
   rigidly bonding, with a bonding composite, the bonding zones to said surfaces of said teeth,
   wherein the variation of the cross section relates to one or more of: the contour of the cross section, the angular position of the cross section about the main direction X of said shape memory band, the nature of the shape memory material or any additional materials that define the cross section, and the arrangement of the materials that define the cross section,
   no portion representing more than 5% of the length of the band exhibiting a cross section that is constant.

2. The method as claimed in claim 1, in which said variation also relates to the properties of the shape memory material or additional materials that define the cross section.

3. The method as claimed in claim 1, in which, in step c), a shape memory band is produced of which no portion representing more than 2% of the length of the band exhibits a cross section that is constant.

4. The method as claimed in claim 1, wherein the bonding zones of the shape memory band comprise a first and a second said bonding zones succeeding one another in the main direction X, and wherein
   in step c), the local cross section of an inter-fixings portion extending between first and second said bonding zones succeeding one another in the main direction X of said shape memory band is varied locally according to the forces that are to be exerted on a first tooth and a second tooth to which said first and second bonding zones are respectively intended to be bonded.

5. The method as claimed in claim 1, in which, in step c), one or more regions of the shape memory band is or are heat treated so as to locally reduce the forces exerted on the teeth in the service position.

6. The method as claimed in claim 5, in which, in step c), the intensity of the heat treatment of a region of the shape memory band is dependent on the distance, from the incisors of said patient, of the teeth in the vicinity of said region in the service position.

7. An orthodontic appliance produced according to a method as claimed in claim 1.

8. The method as claimed in claim 1, in which the shape memory band comprises one or more portion(s) in which the cross section varies progressively along the main direction X, the cumulative length of said portion or portions representing more than 50% of the length of said shape memory band.

9. The method as claimed in claim 1, in which the shape memory band comprises at least one region made from a material selected from the group formed by nickel-titanium NiTi, CuAlZn and CuNiAl alloys.

10. The method as claimed in claim 1, in which the shape memory band comprises fixing portions made of steel and inter-fixings portions made of a shape memory material, said fixing portions and inter-fixings portions succeeding one another in the main direction of the shape memory band.

11. The method as claimed in claim 1, in which the shape memory band comprises a slot in which a reinforcer can be housed in order to stabilize the shape of said shape memory band, and/or comprises hooks allowing the attachment of intermaxillary elastics.

12. The method as claimed in claim 1, in which hooks allowing the attachment of intermaxillary elastics are positioned on a reinforcer and/or in a fixing portion.

13. The method as claimed in claim 1, in which each bonding zone is fixed directly to a back face or to a vestibular face of a respective tooth.

14. A method for producing and applying a shape memory band of an orthodontic appliance, said shape memory band having a main direction X passing through the centers of the cross-sections of said shape memory band along the length of said shape memory band, said shape memory band being one piece, having a variation of a cross section according to the longitudinal position of said cross section, and comprising bonding zones configured in such a way as to exhibit a shape substantially identical to that of respective teeth, at least part of the shape memory band being made from a shape memory material, said method comprising the following steps:
a) determining an orthodontic treatment suitable for moving the teeth of a patient in order to achieve a desired arrangement starting from an initial arrangement of said teeth;
b) determining a set of forces to be exerted locally on said teeth, in a service position, in order to obtain said orthodontic treatment and determining the shape of the surface of the teeth to which bonding zones of said shape memory band are to be bonded;
c) producing said shape memory band with a 3D printer, said shape memory material having an actual stable shape, the local cross section of said shape memory band being determined for the shape memory band to apply said forces when said shape memory band is in the service position and a memorized stable shape of said shape memory material, different than said actual stable shape, is active;
said memorized stable shape being activable with a temperature above a threshold temperature less than a patient's body temperature,
said producing of said shape memory band being in such a way as to define bonding zones substantially identical to the surfaces of said teeth to which they are to be bonded, and
the shape memory band being at a temperature below said threshold temperature, rigidly bonding, with a bonding composite, the bonding zones to said surfaces of said teeth,
wherein the variation of the cross section relates to one or more of: the contour of the cross section, the angular position of the cross section about the main direction X of said shape memory band, the nature of the shape memory material or any additional materials that define the cross section, and the arrangement of the materials that define the cross section,
no portion representing more than 5% of the length of the band exhibiting a cross section that is constant.

15. A method according to claim 14, in which, to manufacture the shape memory band, an orthodontist deactivates the memorized stable shape by cooling the shape memory material below said threshold temperature, then a robot shapes the shape memory band, in three dimensions, to make it correspond to the teeth of the patient before the orthodontic treatment, then the orthodontist bonds the shape memory band on said teeth while at the same time keeping the temperature of the shape memory band below said threshold temperature, so that, once bonded, the temperature of the shape memory band rises toward the patient's body temperature, exceeds the threshold temperature, and activates the memorized stable shape so as to generate customized forces to obtain a correction in a positioning of the teeth, in all three dimensions in space.

* * * * *